Aug. 30, 1960  E. W. REYNOLDS  2,950,810
CAPSTAN DRIVE APPARATUS
Filed June 13, 1957
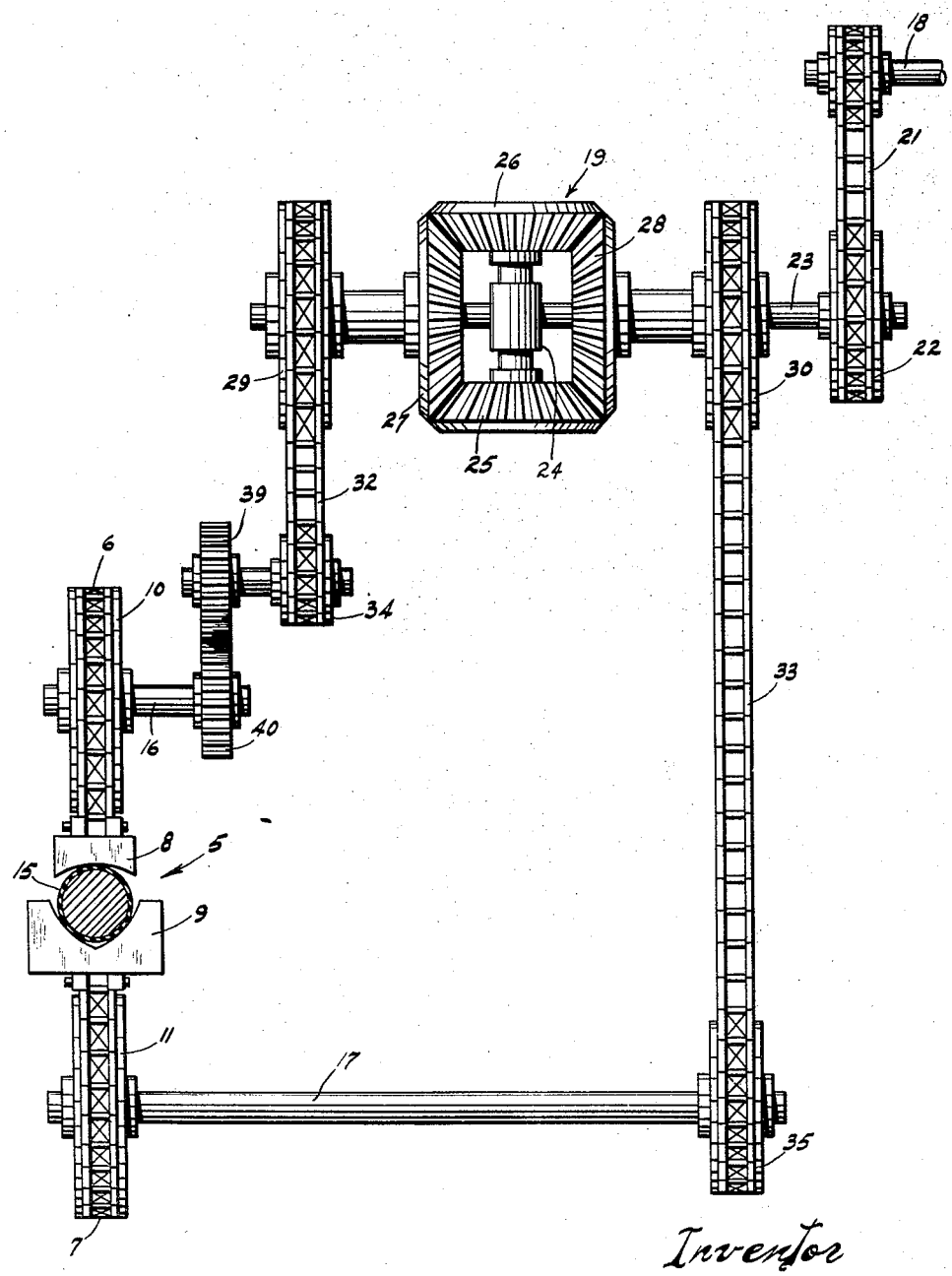
Inventor
E. W. REYNOLDS
By
Attorney United States Patent Office 2,950,810
Patented Aug. 30, 1960

2,950,810

CAPSTAN DRIVE APPARATUS

Ellwood W. Reynolds, Watchung, N.J., assignor to Western Electric Company, Incorporated, New York, N.Y., a corporation of New York Filed June 13, 1957, Ser. No. 665,548

1 Claim. (Cl. 226—172)

This invention relates to capstan drive apparatus and particularly to apparatus for minimizing slip between the capstan mechanism and strand-like materials being advanced thereby.

Tractor type capstans are in general use for advancing strand-like materials where the material to be advanced, for example, large cable, is stiff or cannot be subjected to stresses resulting from being curved around a driven drum or rotary capstan. In a tractor capstan two horizontally disposed opposing portions of endless belts or tractor chains are utilized to grip and pull the strand-like material. The drive mechanisms of the advancing members are made substantially identical so that they may be driven directly from a main drive source and be moved at identical speeds and deliver equal pulling forces to the advanced material. Universal type rubber blocks are normally utilized on the chains for making friction contact with the strand-like material. The universal design permits adjusting the spacing between these chains to adapt the capstan to different strand sizes. The top set of rubber blocks provides a line contact with the strand-like material and the bottom set provides a double line contact. The contacting surfaces of the blocks are arcuately shaped, the upper one having a single radius surface and the lower ones having a compound or double radius surface. A tractor capstan with universal gripper blocks is disclosed in Patent 2,251,291, to L. O. Reichelt.

Heretofore, the chain sprockets for the tractor chains have been positively geared together and the sprockets rotated at the same angular velocities. Due to uneven stretching between the two tractor chains, however, the chains did not move at exactly the same linear speeds; consequently, the cumulative effect of these differences resulted in building up large stresses in the drive system. In some instances, these stresses caused drive gear breakage and uneven pulling on the material being advanced. Thereafter, the two cable advancing members were driven through a differential to equalize the pull of each chain and make it possible for them to maintain identical linear velocities.

The use of a differential in the capstan drive is entirely satisfactory so long as the necessary pulling force on each of the chains does not exceed its friction drag on the advancing article. This limitation, though of little consequence where the coefficient of friction between the material to be advanced and the tractor chains is high, becomes serious in advancing or pulling strand-like materials which are lubricated or have low coefficients of friction with the gripping blocks of the capstan. For example, in fabricating steel jacketed cables where a pulling force of about 1,000 pounds is required, even though excessive pressures are applied normal to the the cables (to the point where the cables are substantially flattened) to increase the capstan drag, frequent slipping still results. As a result, it is difficult to maintain uniform movement of such cables in pulling them through the fabricating or processing lines.

The principal object of this invention is to minimize slipping in such cable take-up systems.

Another object is to proportion the pull exerted by each of the opposing material advancing members so that a maximum total pulling force may be exerted on the material.

Applicant discovered that the torque required to drive the capstan advancing members or tractor chains to produce slipping are not the same and that maximum pull may be obtained from the capstan if the pulling force of the capstan is divided between the two material advancing members such that they are in proportion to the ratio of the maximum pulling force which may be applied to each of the members without producing slip. With such proportioning the pull of the capstan may be gradually increased by increasing the input thereto, up to a maximum value at which both of the advancing members will start slipping at the same time.

In a preferred embodiment of the invention, a drive system for a capstan utilizes a differential between the main drive and the drive shafts for the upper and lower material advancing chains with proportioning gearing systems between the differential and the drive shafts. The two proportioning systems for the drive shafts proportion the torque delivered to each of the drive shafts in a ratio equal to the ratio of the respective torque values required to produce slip. In this way the pressures applied normal to the advanced material may be held to a minimum value.

These and other features of the invention will be more fully understood from the following detailed description taken in conjunction with the schematic diagram of accompanying drawing showing the invention embodied in a differential drive system for a tractor capstan.

In the drawing a tractor capstan 5 is shown in end elevation with two material advancing members 6 and 7 comprising sprocket chains with resilient tractor or gripping blocks 8 and 9 attached thereto. While the blocks are attached to successive portions of the full lengths of the chains, only one pair of blocks is disclosed in order that the chains 6 and 7 and drive sprockets 10 and 11 therefor might be shown in this schematic diagram. Opposing portions of the chains with the blocks 8 and 9 facing one another extend parallel to a cable 15, or any other strand-like material to be advanced, therebetween, means (not shown) being provided to urge the blocks into gripping engagement with the cable 15. The blocks shown are of a universal type, the block 8 having a single radius surface for making a single line contact with the top of a cable and the lower block 9 having a double radius surface for making two lines of contact with the cable. Specific capstan and gripper block structure is disclosed in the aforementioned patent.

Drive shafts 16 and 17 for the sprockets 10 and 11 are driven in opposite directions from a main drive shaft or source of power 18 through a differential gearing device 19. Power is supplied from the shaft 18 through a chain drive 21 to a sprocket 22 on the input shaft 23 of the differential 19. The shaft 23 rotates a spider member 24 for planetary gears 25 and 26. The planetary gears mesh with a pair of output gears 27 and 28 which in turn drive sprockets 29 and 30, respectively. Sprocket chain 33 connects sprocket 35 on the drive shaft 17 with the differential output sprocket 30, the two sprockets being the same size. The drive shaft 16, on the other hand, is driven by the differential output sprocket 29 through a smaller sprocket 34 and unity ratio gears 39 and 40.

Since the torque delivered from the differential to the output sprockets 29 and 30 is equal, by providing different gear ratios in the gearing proportioning systems of the two differential outputs, between sprocket 29 and the capstan drive shaft 16 for the one output and between sprocket 30 and the capstan drive shaft 17, for the other, the torque delivered to the shaft 17 may be made greater than the torque delivered to the shaft 16 by a ratio equal to the gear reduction ratios of these two gear proportioning systems. For universal gripper blocks of the type disclosed, it has been found that the capstan drag of the upper, single radius blocks 8 was about one-half of that of the lower, double radius blocks 9 so that optimum pulling force was made available by the capstan when a 2 to 1 gear reduction was used in the proportioning system for the upper chain 6 as compared to a 1 to 1 ratio for the lower chain 7. With such an arrangement, maximum pulling force may be exerted by both the upper and lower chains and both chains will start slipping at the same time when the pulling force of the capstan is increased over this value. For different gripper structures the ratio between proportioning systems may be different, however, the same principles apply, namely, that the torque delivered to each of the driven members should be in direct proportion to their respective friction drag on the advanced article. The specific values may be obtained through trial and error.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

In a drive system for article advancing apparatus, a tractor capstan having at least two opposed driven members in friction contact with an article therebetween, said members normally being driven at substantially identical speeds and cooperating to exert a pulling force on the article parallel to the direction of travel of the article between the members, the force required on each of the members being a different value, a differential gearing device having an input and two outputs, a source of power for driving the differential input, driving connections including gear trains between the two differential outputs and respective ones of said two driven members with relative gearing ratios of the gear trains being selected so that the forces delivered by the driven members on the article are proportioned in the ratio of the forces required on each member to maintain the substantially constant speed with its opposed member.

References Cited in the file of this patent

UNITED STATES PATENTS

| | | |
|---|---|---|
| 2,251,291 | Reichelt | Aug. 5, 1941 |
| 2,542,917 | Fischer et al. | Feb. 20, 1951 |

OTHER REFERENCES

College Physics by Weber, White and Manning, published by McGraw-Hill Book Co., Inc., New York, N.Y., Second edition, copyright 1952, page 71.